United States Patent [19]

Taylor

[11] 3,933,344
[45] Jan. 20, 1976

[54] LIQUID SPRING-SHOCK ABSORBER ASSEMBLY

[75] Inventor: Paul H. Taylor, Grand Island, N.Y.

[73] Assignee: Tayco Developments, Inc., North Tonawanda, N.Y.

[22] Filed: Apr. 21, 1975

[21] Appl. No.: 569,601

Related U.S. Application Data

[63] Continuation-in-part of Ser. No. 390,875, Aug. 23, 1973, abandoned.

[52] U.S. Cl............... 267/64 A; 188/316; 188/322; 267/116; 267/139; 293/60
[51] Int. Cl.².......................................... F16F 5/00
[58] Field of Search...... 188/316, 322; 213/43, 223; 293/1, 60, 70, 85; 267/64 R, 64 A, 65 R, 116, 120, 136, 139

[56] References Cited
UNITED STATES PATENTS

| | | | |
|---|---|---|---|
| 1,702,675 | 2/1929 | Ventura | 293/70 |
| 2,883,181 | 4/1959 | Hogan | 267/64 R |
| 3,164,262 | 1/1965 | Price et al. | 213/43 |
| 3,240,355 | 3/1966 | Karbowniczek | 213/43 |
| 3,618,928 | 11/1971 | Taylor | 188/322 |

FOREIGN PATENTS OR APPLICATIONS

| | | | |
|---|---|---|---|
| 100,153 | 1/1962 | Netherlands | 188/316 |
| 484,226 | 9/1953 | Italy | 188/316 |
| 1,204,465 | 11/1965 | Germany | 267/65 R |

Primary Examiner—George E. A. Halvosa
Assistant Examiner—Edward R. Kazenske
Attorney, Agent, or Firm—Hume, Clement, Brinks, Willian, Olds & Cook, Ltd.

[57] ABSTRACT

A liquid spring shock absorber is provided with an improved piston head-piston rod assembly free of stress force concentrating design features. The shock absorber assembly further includes a slidably extending member for the accomodation of tension loads.

7 Claims, 14 Drawing Figures

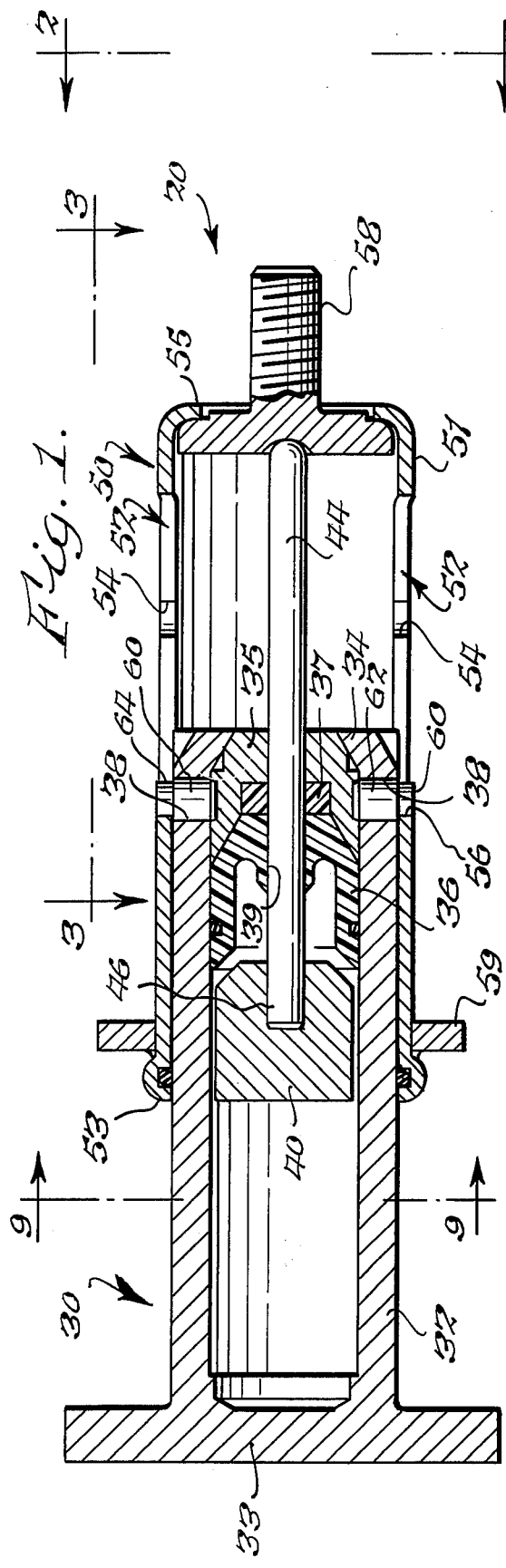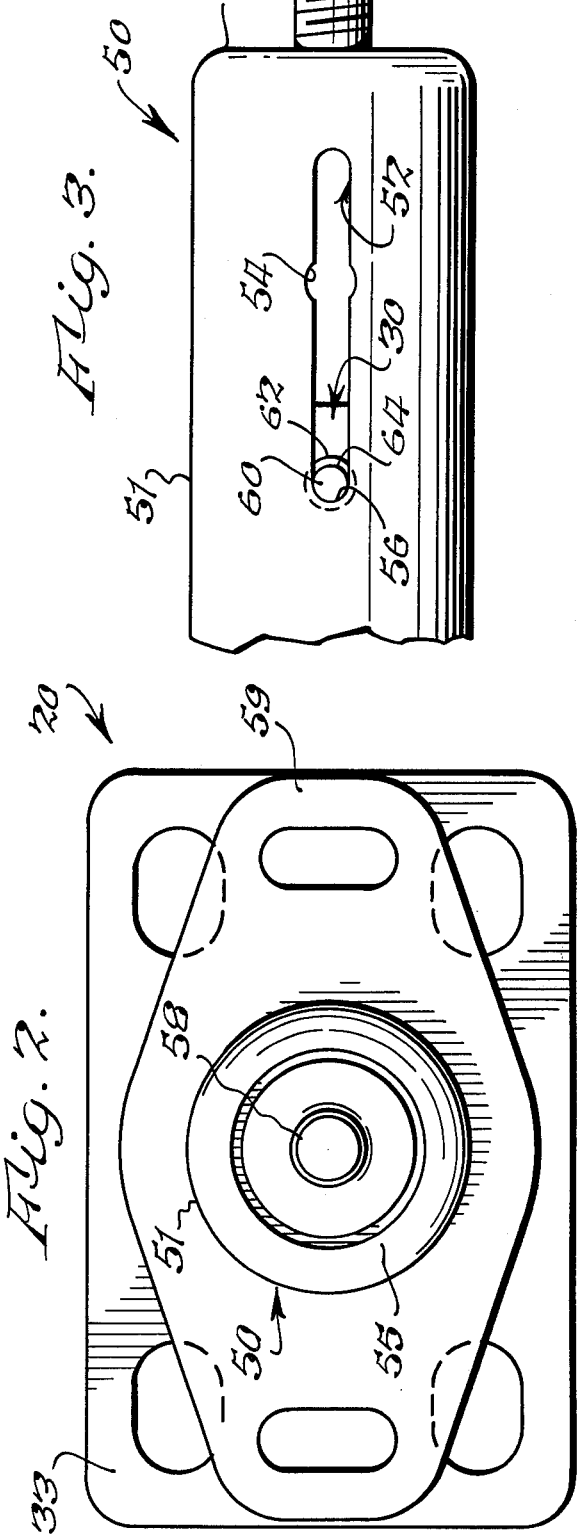

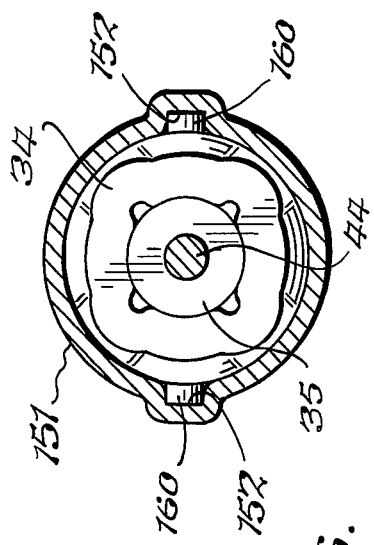
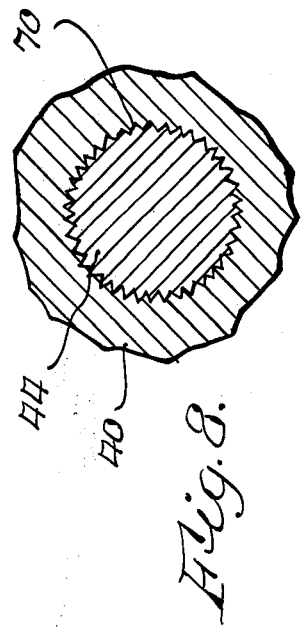
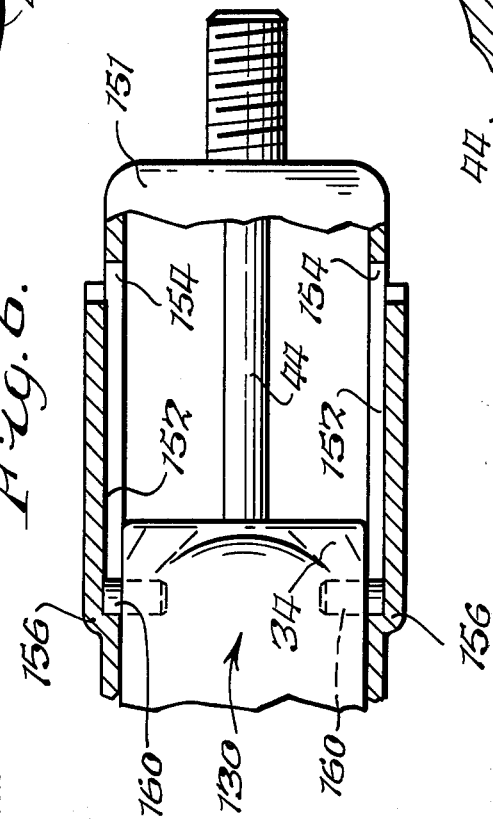
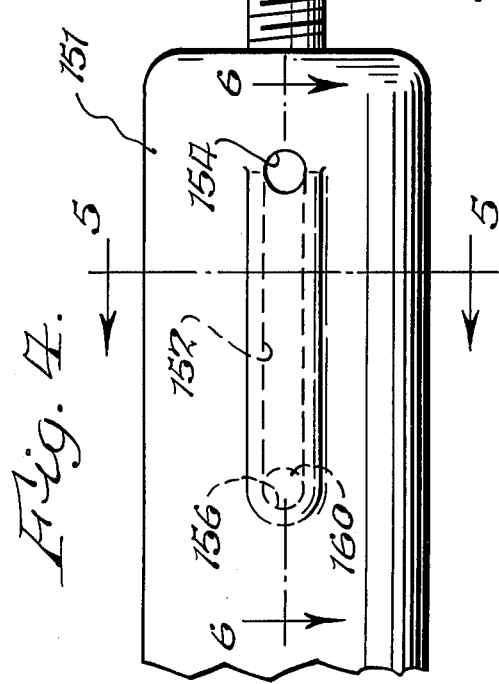
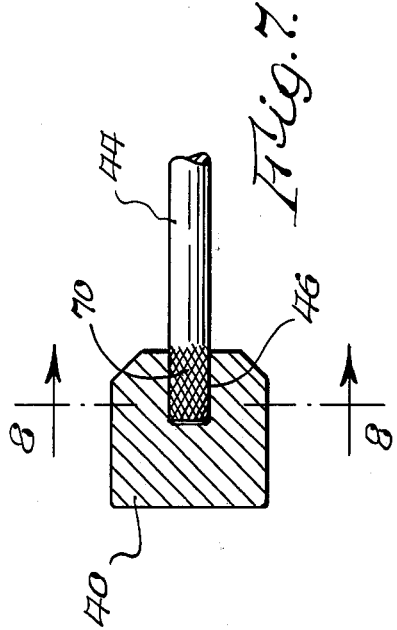

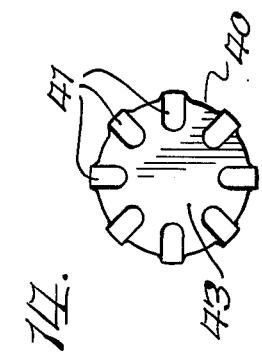
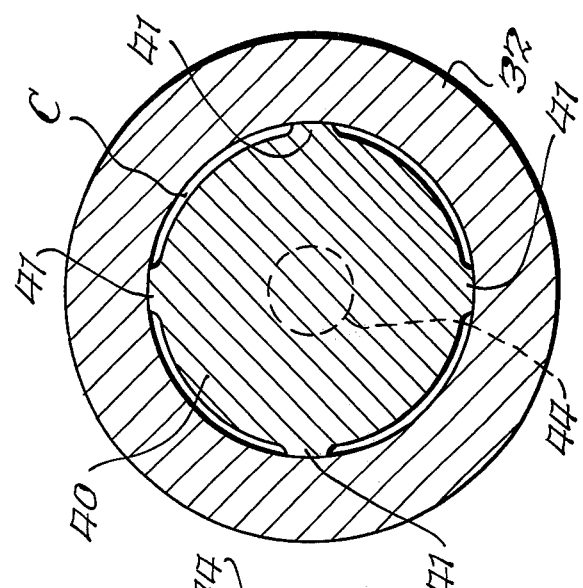
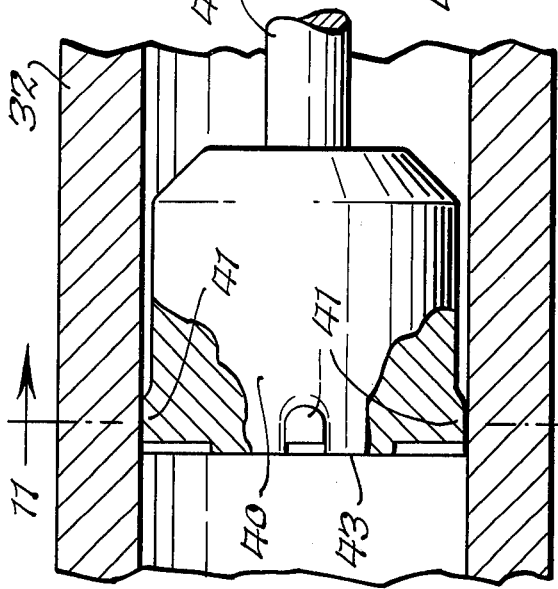
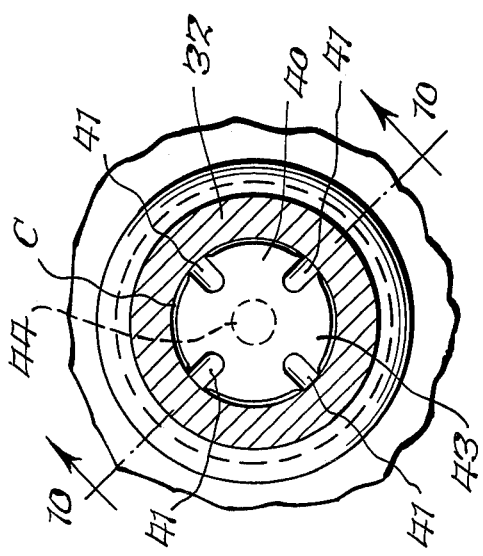
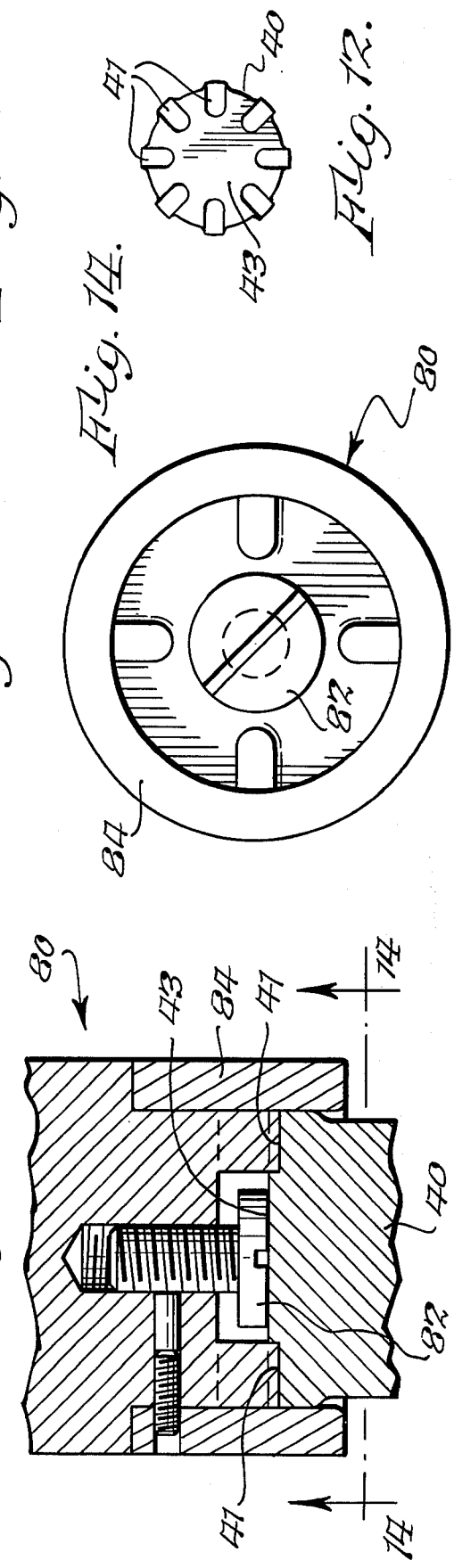

LIQUID SPRING-SHOCK ABSORBER ASSEMBLY

This is a continuation-in-part of copending application Ser. No. 390,875 filed Aug. 23, 1973, now abandoned.

BACKGROUND OF THE INVENTION

This invention relates to shock absorbers and, more specifically, to a shock absorber assembly incorporating a liquid spring assembly capable of withstanding both compression and tension forces.

A need for highly-efficient, low cost, reliable shock absorbers has arisen in several diverse areas. Because of the increase in emphasis on automotive safety, devices have been developed for the mitigation of impact forces encountered by automobile bumpers. It has also been found desirable to provide the coupling mechanism of railroad cars with an energy absorbing system. One such device which has met with success in these applications is the liquid spring, fluid amplification shock absorber. This device employs a housing adapted to hold a body of fluid, a sweeping means, such as a piston head, slidably disposed within the housing, and a body of compressible fluid within the housing. Impact forces are transmitted through a piston rod to the piston head which then sweeps through the housing. The piston rod and head compress and displace the fluid therein, whereby the impact force is dissipated. The fluid amplified, liquid spring shock absorber is described more fully in U.S. Pat. No. 3,722,640.

While this device has been found to be highly suitable for mitigation of compressive shock forces, some difficulties have been encountered when the device is required to withstand tension loads which occur, for example, when an automotive vehicle is towed by its bumper or when railway cars are in draft.

Further difficulties have been experienced in holding the concentricity tolerances to provide even flow between the piston and housing of the aforementioned patent. Additionally, even flow problems have been encountered where the side loading of a side blow on a vehicle bumper has caused shifting of the piston head in the housing.

The incidence of malfunction of the liquid spring shock absorber associated with tension loads is related to the fact that these devices operate by virtue of a 10% compression of volume of the fluid within the housing. Piston rod displacement, therefore, dictates the size of the entire unit. In order to reduce the assembly size and weight and resulting cost, it is necessary to reduce piston rod displacement to a minimum. The piston rod is, therefore, designed to the minimum dimensions which will withstand only the compressive forces anticipated. Such design requires the use of costly, relatively brittle materials, and of course, notching or threading the piston rod in order to accomodate tension loads results in the concentration of stress forces which induces fatigue failures.

Furthermore, where the piston rod is used to accept tension loads, the point of attachment between the piston head and piston rod is also a potential stress concentration point and for this reason it has been necessary to construct a solid, one-piece piston head and rod. This, of course, is very costly due to the waste of construction materials.

SUMMARY OF THE INVENTION

In accordance with the present invention the above-identified problems and disadvantages associated with the automotive, rail transportation, and industrial applications of liquid spring shock absorbers are obviated. The shock absorber assembly of the present invention includes a liquid spring assembly, as heretofore described, including the improvements wherein the piston rod is press fitted within the piston head such that the frictional force created by the press fit is sufficient to maintain the piston rod in fixed relation with the piston head even after the liquid spring assembly is pressurized. Furthermore, the shock abosrber assembly of the present invention utilizes a piston rod of constant cross-sectional area which is free from stress force concentrating design features. Finally, the shock absorber assembly contemplated herein accomodates tension loads through utilization of a jacketing member which is slidably disposed over the liquid spring assembly and which abuts with the outwardly disposed end of the liquid spring assembly piston rod. This jacketing member also includes means for maintaining its slidable disposition over the liquid spring assembly even when subjected to maximum extension by application of a tension load.

BRIEF DESCRIPTION OF THE DRAWINGS

The various embodiments of the shock absorber assemblies of this invention will be better understood by reference to the following drawings:

FIG. 1 is a vertical longitudinal section of a typical shock absorber assembly of this invention.

FIG. 2 is an end view of the shock absorber assembly taken along line 2—2 of FIG. 1.

FIG. 3 is a plan view of the shock absorber assembly taken along line 3—3 of FIG. 1.

FIG. 4 is a view similar to that of FIG. 3 but of another embodiment of the invention.

FIG. 5 is a sectional view of one embodiment of the invention taken along line 5—5 of FIG. 4.

FIG. 6 is a view partially in section, of the embodiment shown in FIG. 4 taken along lines 6—6.

FIG. 7 is a vertical sectional view of another embodiment of the invention showing a piston head mounted on a piston rod.

FIG. 8 is an enlarged sectional view taken along line 8—8 of FIG. 7.

FIG. 9 is a fragmentary sectional view of the shock absorber assembly taken along line 9—9 of FIG. 1.

FIG. 10 is an enlarged fragmentary view taken along line 10—10 of FIG. 9.

FIG. 11 is a sectional view taken along line 11—11 of FIG. 10.

FIG. 12 is an end elevation of one embodiment of a piston head as used in this invention.

FIG. 13 is a vertical sectional view of a piston head of one embodiment this invention being formed by a die tool.

FIG. 14 is an elevation view of the die tool of FIG. 13 as viewed from line 14—14.

DESCRIPTION OF VARIOUS EMBODIMENTS

FIG. 1 illustrates one embodiment of the shock absorber assembly of the present invention suitable for use as a bumper shock on automotive passenger vehicles. This shock absorber assembly, designated generally 20, includes a liquid spring, fluid amplified, shock absorber subassembly 30 in slidable communication with a jacketing member 50.

The liquid spring assembly 30 includes a housing 32, which is capable of holding fluids, a closed end 33, and a crimped portion at 34. Crimped portion 34 holds in place a cap 35 which supports a seal 36. A guide ring 37 is disposed between the seal 36 and cap 35 to absorb bearing loads and prevent extrusion of the seal when liquid-spring assembly 30 is pressurized. Piston head 40 is capable of reciprocal movement within housing 32 and is mounted on piston rod 44.

In this configuration the liquid spring piston rod operates in a bore 39 of the seal 36 and acts as a liquid spring piston. The piston head 40 reciprocates in housing 32 and acts as a shock absorber head. Together piston head 40 and piston rod 44 provide an integrated liquid spring shock, e.g. both spring and shock absorber. The construction, materials, and operation of the liquid spring shock absorber subassembly employed in this invention is explained in greater detail in U.S. Pat. Nos. 3,256,005 and 3,722,640.

Referring more particularly to the piston head and piston rod, one feature of the present invention is the novel low cost securement means utilized to form this assembly. Because of tension loads to which the piston rod 44 may be subjected, it is necessary to utilize a piston rod-to-piston head assembly design which is free of stress concentration features such as threads, notches, weld points, etc. The present invention meets these needs by mounting the piston head 40 to the piston rod 44 by means of an interference press fit at 46. The frictional force created by interference fit 46 must be sufficient to overcome internal pressure forces within the housing 32 which work to expel piston rod 44 from the liquid spring assembly.

In order to provide an appropriate interference fit the piston head 40 is provided with a circular pocket having an internal diameter slightly less than the diameter of the piston rod 44. The pocket should be deep enough such that the piston rod 44 may be inserted therein to a depth at least equal to its diameter, as is clearly shown in FIG. 1. This insures that the piston rod will not come loose due to non-axial loading.

A typical assembly employs a piston rod of 0.3 inch diameter. At the normal preload pressure of 10,000 psi, sufficient frictional force will be created only where at least 700 pounds of pre fit load are required to secure the interference fit. This frictional force will be sufficient to overcome the internal pressure forces acting on the piston rod 44 at surface 48.

An interference fit which develops the requisite frictional forces is desirable not only for liquid spring shock absorbers wherein the piston rod is adapted to accomodate tension load bearing attachments, but also those liquid spring shock absorbers assemblies which utilize a jacketing member as described hereinbelow. In these latter applications the requisite frictional forces need be developed in the interference fit since the liquid spring is pressurized prior to assembly to the jacketing member. Without the appropriate interference fit it is possible for the piston rod to be expelled from the liquid spring assembly with bullet-like velocity with obvious attendant safety perils.

Of course, other embodiments of the piston rod 44 and piston head 40 may provide alternative securements means, as is demonstrated in FIGS. 7 and 8, wherein piston rod 44 is provided with knurled surface 70. This configuration is of value where insertion of piston rod 44 into piston head 40 does not provide an interference fit 46 with sufficient frictional holding force. The knurled surface 40 will assist in developing the required frictional force without concentrating stress forces through a cross-section of piston rod 44. It is required, however, that the frictional force created by the interference press fit at 46 will be sufficient to maintain the piston rod 44 in a fixed relationship with the piston head 40 after the liquid spring shock absorber assembly 30 has been pressurized.

FIGS. 1 and 3 illustrate one embodiment of the tension load accomodating feature incorporated in the shock absorber assembly of the present invention. A jacketing member 50 is maintained in slidable communication with the liquid spring shock assembly 30. Jacketing member 50 includes a jacketing tube 51 with an open end at 53 which is slidably disposed over housing 32 and a closed end at 55 which abuts with the outwardly disposed end portion of the piston rod 44. The housing 32 is provided with a plurality of protuberances which extend radially from the housing 32 near its crimped end 34. The jacketing tube 51 is provided with elongated guide means which align with the protuberances thereby maintaining the jacketing member in slidable communication with liquid spring assembly 30. Jacketing member 50 is also provided with connecting means such as threaded bolt 58 or slotted flange 59 for accomodation of tension load-bearing attachments.

A particularly preferred means for maintaining jacketing member 50 in slidable communication with liquid spring assembly 30 is illustrated in FIGS. 1 and 3. The liquid spring assembly 30 has holes 38 drilled through the housing 32 and into cap 35. The jacking tube 51 is provided with elongated slots 52 which include an enlarged aperture 54 located therein other than at the towing extremity 56. Jacketing member 50 is placed over the pre-pressurized liquid spring shock absorber sub-assembly 30 and the entire shock absorber assembly 20 is compressed until apertures 54 align with holes 38. Tow pins 60 are then inserted through the apertures 54 into holes 38 and the jacketing member is released. Tow pins 60 are made from strong impact resistent material, such as steel, and they are provided with an enlarged portion 62 and a narrow portion 64. Enlarged portion 62 communicates with the hole 38 while the narrow portion 64 is slidably engaged within the slot 52. The resulting shoulder in the tow pin 60 prevents it from working loose during use because of vibration and sudden impacts.

Pin 60 is inserted through housing 32 into cap 35 so as to provide additional cap 35 retention means. Since the crimped cylinder has a safety margin of only 50% the pins 60 increase this by another 50% providing a 100% safety factor for holding the liquid spring 30,000 P.S.I. internal pressure. Additionally, when tow loads are imposed the internal liquid spring pressure acting against cap 35 reacts against the tow loads to reduce the effect of rotating the pins out of the cylinder 32.

Another preferred embodiment of this feature of the invention is illustrated in FIGS. 4, 5 and 6. This embodiment is desirable where the bumper shock assembly will be subjected to more extreme impact conditions under which a slotted jacking tube 51 might collapse or distort. Jacking tube 151 is provided, in this embodiment, with a plurality of raised elongated grooves 152 which includes an aperture 154 located therein opposite the towing extremity 156. The grooved guide means 152 provide jacking tube 151 with a riblike construction which has great structural integrity. Furthermore, this embodiment obviates the need for shouldered tow pins since the groove wall itself holds straight tow pins 160 in place.

Both FIGS. 3 and 6 show embodiments of the shock absorber assembly 20 in its extended position with tow pins 60 and 160 at their towing extremities 56 and 156, respectively. Because of the displacement and compression of the compressible fluid within housing 32, the piston head 40 and piston rod 44 are urged toward seal 36. This displacement prevents the occurrance of check valving with its associated high initial shock forces which are unacceptable in automotive bumper shocks. Moreover, the shock absorber assembly 20 when held in this preloaded position is relatively free of rattles and vibration which may accelerate fatigue failures. FIGS. 9, 10, 11 and 12 illustrate another embodiment of the improved shock absorber assembly of the present invention. The piston head 40 includes a shaped peripheral surface which forms a fluid passage with the housing 32. This passage or annular orifice is designated as C in FIGS. 9 and 11. In order to provide the appropriate fluid amplified response it is important that the uniformity of passage C be maintained around piston head 40. Commercial manufacturing techniques, however, make it difficult to maintain the rigid tolerance requirements of fluid amplified, liquid spring shock absorbers. To alleviate these problems it has been suggested to place bearing pads on the piston head to reduce deviations in fluid flow. The bearing pads 41 of the present invention extend to the inner wall of housing 32 such that piston head 40 is maintained in concentric relationship with housing 32. Where a poor tolerance piston head 40 had been manufactured, the bearing pads of this embodiment of the invention can be utilized to correct the problem. Additionally, when the vehicle bumper is subjected to a corner blow, the forces tend to drive an unpadded piston head to one side, due to sliding fit tolerances. This radically lowers the shock force when the greatest shock force is required, because only one bumper shock may be operated. The bearing pads 41 of this invention are formed as an integral part of piston head 40 by stamping the face 43 of piston head 40 with a die tool as best illustrated in FIG. 13. As a result of the stamping operation material is displaced from face 43, outwardly, to form the bearing pad 41. Die tool 80 includes a threaded stop 82 which allows the degree of upset to be controlled precisely, and an outer collar 84 can be employed to shape, exactly, the external surface of bearing pad 41. The bearing pads 41 of the present invention also aid in dampening the return movement of piston head 40 to its stable position after release of compression forces. This dampening effect prevents the piston rod 44 from impacting on the abutting, closed end 55 of the jacking tube 51 with so great a force as to allow jacking tube 51 to shear towing pins 60 thereby resulting in malfunction of the shock absorber assembly.

It should be understood that the various modification and changes in the embodiments discussed herein can be made without departing from the spirit and scope of the invention.

I claim:

1. In a liquid spring shock absorber assembly including housing means adapted to hold a body of fluid, a piston head having a longitudinal axis and slidably disposed within said housing means, a semi-flexible seal and retaining cap disposed within one end of said housing means, and a body of compressible fluid within said housing means the improvements comprising:
   a. a piston rod slidably disposed along the longitudinal axis of said piston head and through said seal and cap and having a first end portion disposed outside said housing means and a second end portion frictionally engaged in a press fit relationship within said piston head, whereby the area of frictional engagement and the frictional force created by said press fit is sufficient to maintain said piston rod and said piston head in fixed engagement after said compressible fluid is pressurized within said housing means; and
   b. a jacketing member having an open end slidably disposed over said housing means, a closed end abutting the first end portion of said piston rod, guide means for maintaining said open end in slidable disposition with said housing means, and a plurality of tow pins inserted through said housing means and into said retaining cap, said tow pins being aligned with said guide means, whereby said jacketing member accomodates tension loads applied to the shock abosrber assembly and none of said loads are transmitted to said piston rod.

2. The liquid spring shock absorber assembly of claim 1 wherein said piston rod is of uniform cross-sectional area throughout its length, whereby said piston rod has no stress force concentrating design features.

3. The liquid spring shock absorber assembly of claim 1 wherein each one of said tow pins is aligned within a single guide means.

4. The liquid spring shock absorber assembly of claim 3 wherein said guide means are slots, said slots and said tow pins shaped so as to prevent disengagement of said tow pins from said housing means and said retaining cap.

5. The liquid spring shock absorber assembly of claim 3 wherein said guide means are elongated axially extending raised grooves.

6. The liquid spring shock absorber assembly of claim 1 wherein said piston head includes a shaped peripheral surface forming a fluid passage between said housing and said shaped surface and a plurality of integrally formed bearing pads which extend radially from said shaped surface to said housing, whereby said piston head is maintained in concentric relationship within said housing.

7. The liquid spring shock absorber assembly of claim 1 wherein said piston rod is inserted to a depth within said piston head at least equal to the diameter of said piston rod.

* * * * *